(12) United States Patent
Kubota et al.

(10) Patent No.: US 7,320,549 B2
(45) Date of Patent: Jan. 22, 2008

(54) SELF-LUBRICATING BUSHINGS, BEARINGS AND BEARING ASSEMBLIES

(75) Inventors: Masaaki Kubota, Sterling Heights, MI (US); Jun Osawa, Sterling Heights, MI (US); Larry Mitchum, Sterling Heights, MI (US)

(73) Assignee: Sankyo Dilless Industry, (USA) Corp., Sterling Heights, MI (US)

( * ) Notice: Subject to any disclaimer, the term of this patent is extended or adjusted under 35 U.S.C. 154(b) by 159 days.

(21) Appl. No.: 11/129,888

(22) Filed: May 16, 2005

(65) Prior Publication Data

US 2006/0257059 A1    Nov. 16, 2006

(51) Int. Cl.
*F16C 29/02*    (2006.01)
(52) U.S. Cl. ...................... 384/283; 384/284
(58) Field of Classification Search ............... 384/275, 384/276, 282–285, 295, 296
See application file for complete search history.

(56) References Cited

U.S. PATENT DOCUMENTS

| | | | |
|---|---|---|---|
| 379,531 A | 3/1888 | Douglas | |
| 1,174,942 A * | 3/1916 | Bache | 384/283 |
| 1,398,219 A | 11/1921 | Acheson | |
| 1,743,645 A | 1/1930 | Whiteley | |
| 1,751,906 A | 3/1930 | Clark | |
| 1,936,894 A | 11/1933 | Whiteley | |
| 2,265,065 A * | 12/1941 | Daywalt et al. | 384/282 |
| 2,431,430 A | 11/1947 | Shaw | |
| 3,167,366 A * | 1/1965 | Freund | 384/283 |
| 5,267,798 A * | 12/1993 | Budris | 384/282 |
| 5,322,372 A | 6/1994 | You | |
| 5,435,650 A * | 7/1995 | Emig et al. | 384/275 |
| 5,549,394 A | 8/1996 | Nowak | |
| 5,664,890 A | 9/1997 | Nowak | |

FOREIGN PATENT DOCUMENTS

| | | |
|---|---|---|
| DE | 100 32 044 A1 | 1/2002 |
| EP | 0 422 786 A | 4/1991 |
| GB | 1 136 097 | 12/1968 |
| JP | 05126138 A * | 5/1993 |

\* cited by examiner

*Primary Examiner*—Thomas R. Hannon
(74) *Attorney, Agent, or Firm*—Butzel Long

(57) ABSTRACT

Self-lubricating bushings and bearings that include lubricant inserts that have central axes that are aligned substantially parallel to the central axes of their respective bushings or bearings. The lubricant inserts present a side edge that is substantially flush with the corresponding bearing surface of the bushing or bearing. The exposed edges of the inserts can extend to the longitudinal edges of the bearing surface of the bushing or bearing. The bearings and bushing can be incorporated into bearing assemblies.

15 Claims, 5 Drawing Sheets

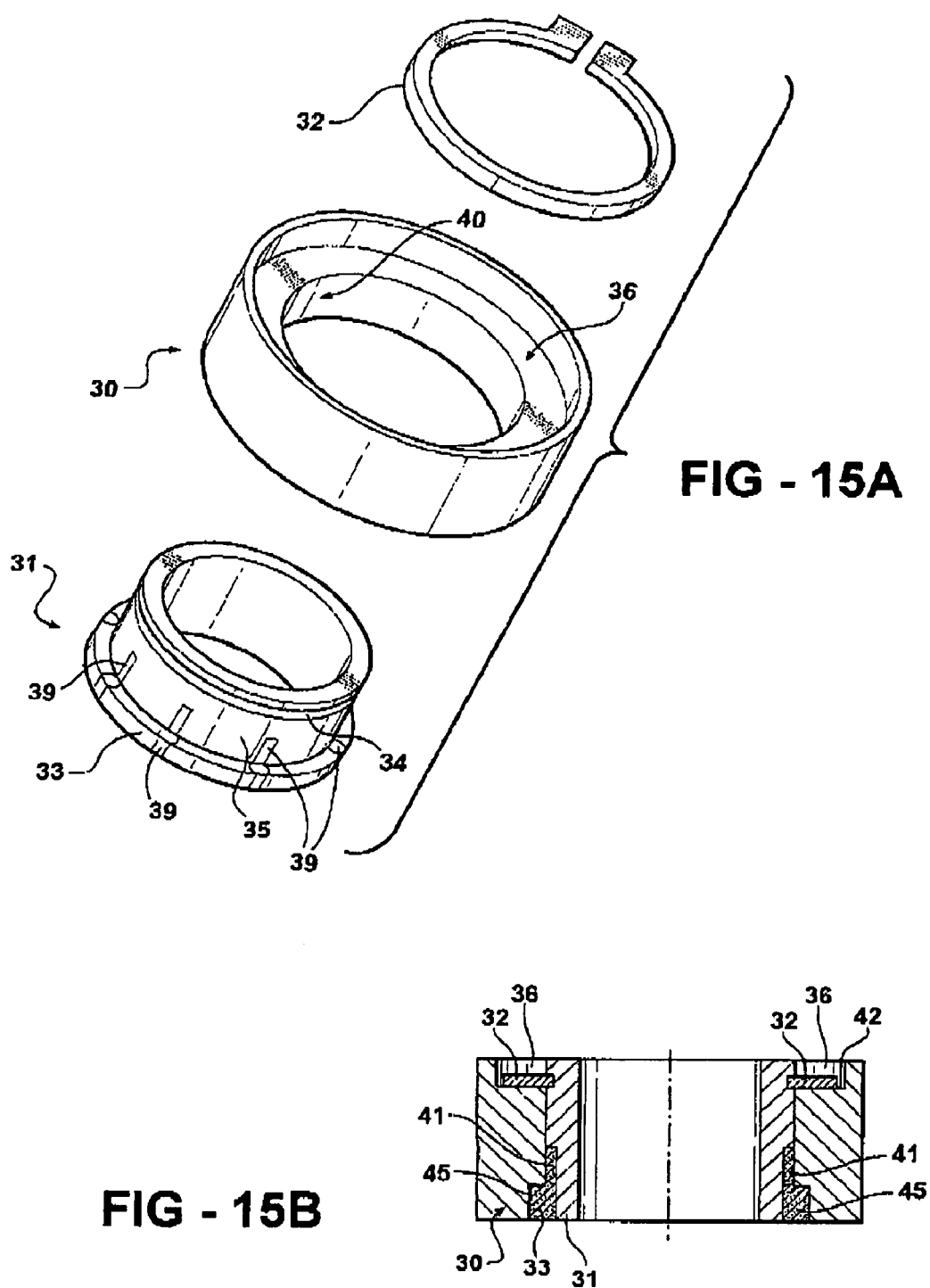

SELF-LUBRICATING BUSHINGS, BEARINGS AND BEARING ASSEMBLIES

TECHNICAL FIELD

The present invention relates to self-lubricating bushings, bearings and bearing assemblies. More particularly, the present invention relates to self-lubricating bushings and bearings that incorporate solid lubricant materials therein in such a way that allows for reduced dimensions of the bushings and bearings and improved performance characteristics as compared to conventional bushing and bearing configurations.

BACKGROUND ART

Bearings are used to reduce frictional forces between two or more parts that are configured and designed to have relative motion and provide support therebetween. In general, bearings can be classified as sliding bearings in which the bearing elements are separated by a film of lubricant and rolling element bearings in which ball bearings, roller bearings, needle bearings, and the like are provided between the moving parts.

Slide-type bearings include all varieties of bearings in which the primary motion involves sliding one surface over or against another. Accordingly, all types of journal or sleeve bearings which are used to position a shaft or movable part in a radial direction are slide-type bearings. Moreover, all types of thrust bearings, which are used in general to prevent movement of a rotating shaft in an axial direction and as guides for linear motion of various types are also slide-type bearings.

Conventional bearings require a lubricant such as a grease or oil that is often periodically applied between the bearing surfaces, i.e., the surfaces of the bearing elements and any surface that are opposed and moved relative to the bearing elements.

A significant improvement over conventional bearings was the development of self-lubricating bearings which incorporate lubricant materials or compositions into the bearing design so that a layer of lubricant is provided and maintained between the bearing surfaces.

Self-lubricating bearings are particularly useful in extreme environments where temperature extremes can degrade conventional lubricants or adversely affect their performance. Self-lubricating bearings also can be used in applications in which conventional lubricants may present an undesirable contamination such as for example in food, textile, drug, pollution control, printing applications, etc. In other applications in which conventional lubricants can adversely react chemically, such as in chemical processing and plating equipment, self-lubricating bearings idea.

A common self-lubricating bearing design includes a bearing structure that is provided with pockets or cavities in the bearing surface into which a lubricating component such as graphite is held. In use, a thin layer of the lubricating component is distributed from the pockets or cavities between the bearing surfaces.

Conventional materials from which self-lubricating bearings are made include copper alloys such as bronze, aluminum bronze, manganese bronze and hardened steel and steel-backed copper alloy structures.

Conventional solid lubricants that are used in self-lubricating bearings include amorphous graphite, polyimide graphite fiber reinforced composites, and molybdenum disulfide.

The present invention is directed to self-lubricating bushings, bearings and bearing assemblies that include unique configurations of solid lubricant inserts.

DISCLOSURE OF THE INVENTION

According to various features, characteristics and embodiments of the present invention which will become apparent as the description thereof proceeds, the present invention provides a self-lubricating bushing that includes:

a main body that has a generally cylindrical shape defined by an annular wall having an inner surface and an outer surface and a central axis; and a plurality of elongated lubricant inserts that have a central axis said lubricant inserts being provided in bores formed in the main body and aligned so that side edge portions of the lubricant inserts are substantially flush with at least one of the inner surface and the outer surface of the annular wall of the main body.

The present invention also provides a bearing assembly which includes:

an outer bushing having a main body portion that has a generally cylindrical shape defined by an annular wall having an inner surface and an outer surface and a central axis;

an inner bushing having a main body portion that has a generally cylindrical shape defined by an annular wall having an inner surface and an outer surface and a central axis, said inner bushing being configured to be received within the outer bushing so that the outer surface of the inner bushing is opposed to the inner surface of the outer bushing; and a plurality of elongated lubricant inserts that have central axes, and are provided in bores formed in at least one of: i) the main body of the outer bushing and aligned so that side edge portions of the lubricant inserts are substantially flush with the inner surface of the main body of the outer bushing; and ii) the main body of the inner bushing and aligned so that side edge portions of the lubricant inserts are substantially flush with the outer surface of the main body of the inner bushing.

Whether the bushings are provided alone or in a bearing assembly, the central axes of the lubricant inserts are substantially parallel to the central axis of the main body of the bushings and the side edge portions of the lubricant inserts that are substantially flush with the inner wall of the main body of the bushings comprise edge portions that extend along the entire length of the lubricant inserts.

The main body of the bushings and the plurality of lubricant inserts can have lengths that are substantially equal. Otherwise, the main body of the bushings can have a length that is greater than the length of the plurality of lubricant inserts. In one embodiment the length of the plurality of lubricant inserts is about half of the length of the main body of the bushings and the plurality of lubricant inserts alternatively extend inward from opposite ends of the main body of the bushings.

The lubricant inserts extend to at least one end of the main body of the bushings, and can extend to both ends of the main body of the bushings. The main body of the bushings can have a recess at one or both of the opposite ends.

The main body of the bushings has an inside diameter, $ID_b$, the central axes of the plurality of lubricant inserts are aligned about common diameter $CD_i$ of the main body of the bushings that is greater that the inside diameter and each of the plurality of lubricant inserts has a radius $R_i$, wherein $ID_b<CD_i<(ID_b+2R_i)$

BRIEF DESCRIPTION OF DRAWINGS

The present invention will be described with reference to the attached drawings which are given as non-limiting examples only, in which:

FIG. 15A is a perspective view of a self-lubricating bushing design according to another embodiment.

FIG. 15B is a cross-sectional view of the bearing assembly of FIG. 15A.

BEST MODE FOR CARRYING OUT THE INVENTION

The present invention is directed to self-lubricating bushings and bearings that incorporate solid lubricant materials therein in such a way that allows for reduced dimensions of the bushings and bearings as compared to conventional bushing and bearing configurations. The bushings, bearings and bearing assemblies of the present invention include unique configurations of solid lubricant inserts which have central axes that can be aligned with the central axes of the bushings or bearings so as to be substantially parallel therewith. Alternatively, the central axes of the solid lubricant inserts can be skewed with respect to the central axes of the bushings or bearings and otherwise generally extend in the axial direction of the bushings or bearings (as opposed to the radial direction of the bushings or bearings).

The bushings and/or bearings are generally cylindrically shaped and can include stepped, grooved, flanged, recessed, or other shaped portions that may be useful to incorporate the bushings or bearings into bearing assemblies. The bushings or bearings can be made from any type of conventional bearing material including, but not limited to, copper alloys such as bronze, aluminum bronze, manganese bronze, brass, copper and hardened steel and steel-backed copper alloy structures.

The solid lubricants that are inserted into the bushing and bearings of the present invention can include any conventional solid lubricants that are used in self-lubricating bearings including, but not limited to, amorphous graphite, polyimide graphite fiber reinforced composite, molybdenum disulfide, etc.

The pockets into which the solid lubricants are inserted can be produced by drilling or machining the blank bushings and bearings.

The ability to reduce the dimensions of the bushings or bearings is achieved in part by the unique manner in which the solid lubricant can be position to extend completely to the edges of the bushings or bearings according to the present invention.

The bushings or bearings of the present invention, including bearing assemblies such as snap bearing designs provide for self-lubrication and resistance to high load/thrust, extreme temperatures and volatile environments at low rpm's.

Figure 1A:
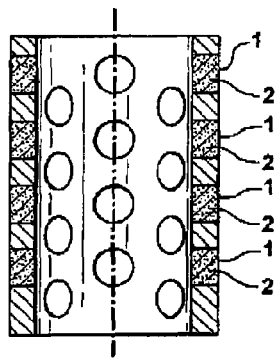
FIGS. 1A-1F are cross-sectional depictions of patterns in which sleeve-type bearings are conventionally drilled or formed with grooved patterns into which a solid lubricant is provided.
Figure 1B:
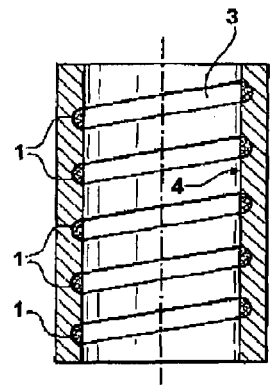
Figure 1C:
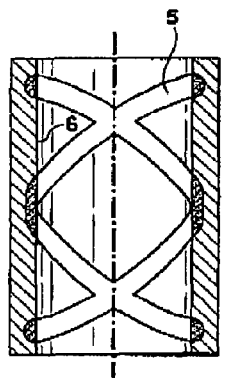
Figure 1D:
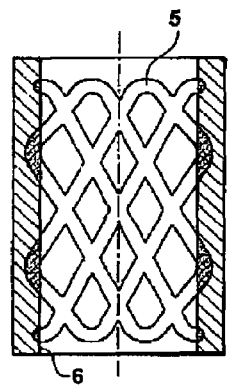
Figure 1E:
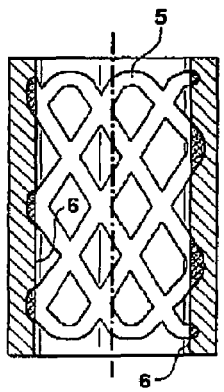
Figure 1F:
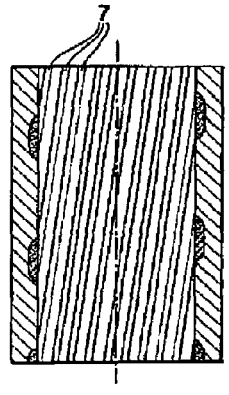

FIGS. 1A-1F are cross-sectional depictions of patterns in which sleeve-type bearings are conventionally drilled or formed with grooved patterns into which a solid lubricant is provided. In each of FIGS. 1A-1F the solid lubricant that is embedded into the walls of the bearings is identified by reference number 1. FIG. 1A depicts a design in which the solid lubricant 1 is inserted into arrays of through-holes 2 that are provided, e.g. drilled, in the sides of the bearing at substantially right angles to the axis of the bearing. FIGS. 1B-1F provides various channel configurations into which the solid lubricant 1 is provided. In FIG. 1B a single spiral shaped channel 3 is provided in the inner wall 4 of the bearing. In FIGS. 1C-1E various cross-helical shaped channels 5 are provided in the inner walls 6 of the bearings. In FIG. 1F a plurality of parallel channels 7 are provided which are generally angled with respect to the central axis of the bearing.

FIGS. 1A-1F are presented to show the present state of the art of oiless or self-lubricating bearings.

Figure 2:
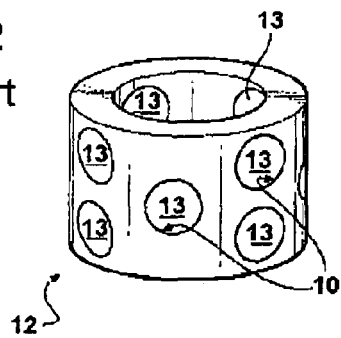
FIG. 2 is a perspective view of a conventional self-lubricating bushing design.

FIG. 2 is a perspective view of a conventional self-lubricating bushing design. In typical fashion, the bushing depicted in FIG. 2 includes holes 10 that are drilled though the sides 11 of the bushing 12 into which the solid lubricant material 13 is placed. As those skilled in the art of self-lubricating bearings are well familiar, the number, diameter and pattern of holes 10 are important to ensure that a thin layer of the lubricating material is spread between the bearing surfaces. As the length of the bushing 12 decreases it becomes increasingly difficult to provide sufficient hole configurations which will apply a thin layer of the lubricating material so that it spreads out between the bearing surfaces. This difficulty is compounded by trying to avoid structurally weakening the bushing by increasing the ratio of apertured to non-apertured surface area of the sides of the bushing 12.

In order to provide self-lubricating bushings and bearings that can have short lengths, the inventors or the present invention conceived of a novel way to align and provide solid lubricant inserts into the bushings and bearings.

Figure 3:
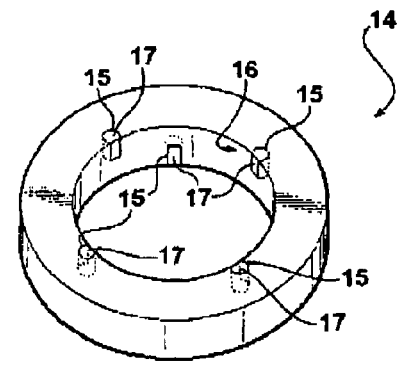
FIG. 3 is a perspective view of a self-lubricating bushing design according to one embodiment of the present invention.
Figure 4:
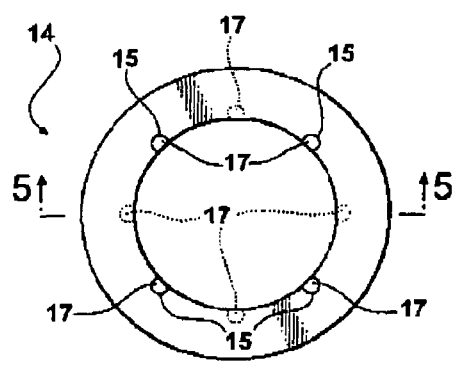
FIG. 4 is an end view of the bushing of FIG. 3.
Figure 5:
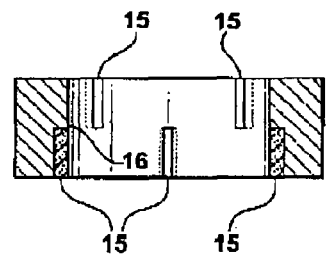
FIG. 5 is a sectional view of the bushing of FIG. 4 taken along section line 5-5.

FIG. 3 is a perspective view of a self-lubricating bushing design according to one embodiment of the present invention. FIG. 4 is an end view of the bushing of FIG. 3. FIG. 5 is a sectional view of the bushing of FIG. 4 taken along section line 5-5. The bushing 14 shown in FIGS. 3-5, has a generally cylindrical shaped body having an inner and outer diameter and a radial thickness. A plurality of holes 15 are drilled or machined in opposite ends of the bushing 14 so as to partially intersect the inner surface 16 of the bushing 14 as shown. The holes 15 have radial centers which are aligned along a common diameter of the bushing which is referred to herein as the center diameter of the inserts ($CD_i$, See FIG. 13). The holes 15 are evenly spaced apart along the center diameter of the inserts with holes 15 in opposite ends of the bushing 14 being evenly off-set as depicted so that every other hole 15 around the circumference extends from an opposite end of the bushing 14.

The holes 15 are filled with a solid lubricant using conventional techniques which will ensure that the resulting lubricant inserts 17 are held securely within the holes 15. The holes 15 are aligned and configured so that an exposed edge of each lubricant insert 17 is substantially flush with the inner surface 16 of the bushing 14 so as to apply a thin film of lubricant between bearing surfaces when the bushing 14 is in use. In order to prevent the lubricant inserts 17 from being removed from the holes 15 in the radial direction, the following relationship can be followed: $ID_b < CD_i < (ID_b + 2R_i)$, where $ID_b$ the Inside Diameter of the bearing, $R_i$=the Radius of the inserts 17 (or holes 15) and $CD_i$=Center Diameter of the inserts. This relationship will help ensure that the lubricant inserts 17 will be physically or structurally secured within holes 15. It is otherwise (or additionally) possible to rely upon chemical bonding to secure the lubricant inserts 17 in the holes 15. It is also possible to provide non-circular holes 15 and complementary shaped non-cylindrical shaped lubricant inserts 17 which are configured to prevent the lubricant inserts 17 from being removed from the holes 15 in the radial direction. For example, the holes 15 and lubricant inserts 17 could include dove-tailed shapes, trapezoidal shapes, and other cooperative engaging shapes. It is also possible to use holes 15 and lubricant inserts 17 that do not have cooperative engaging shapes and rely upon chemical bonding to secure the lubricant inserts 17 from being removed from the holes 15 in the radial direction. For example, the holes 15 and lubricant inserts 17 could have complementary rectangular cross-sectional shapes.

In the embodiment of the self-lubricating bushing depicted in FIGS. 3-5, the lubricant inserts 17 extend at least about half of the length of the bearing 14 as best depicted in FIG. 5, so that, with the lubricant inserts 17 extending alternatively from opposites ends of the bearing 14, their combined lengths provide a lubricant film that is applied across the entire inner surface of the bearing 14.

Figure 6:
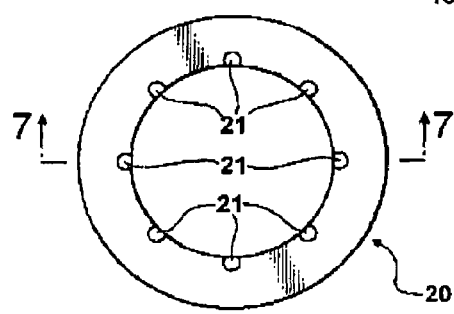
FIG. 6 is an end view of the bushing according to another embodiment of the present invention.
Figure 7:
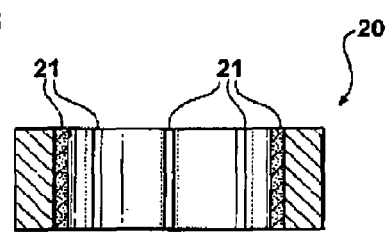
FIG. 7 is a sectional view of the bushing of FIG. 6 taken along section line 7-7.

FIG. 6 is an end view of the bushing according to another embodiment of the present invention. FIG. 7 is a sectional view of the bushing of FIG. 6 taken along section line 7-7. The bearing 20 shown in FIGS. 6 and 7 includes a plurality of lubricant inserts 21 that extend across the full length of the bearing 20. Otherwise, this embodiment is similar to the embodiment depicted in FIGS. 3-5. The bearing design shown in FIGS. 6 and 7 is not as mechanically strong as that of FIGS. 3-5 since the bearing 14 in FIGS. 3-5 does not disrupt the inner surface 16 of the bearing 14 across the entire length of the inner wall, but instead staggers or alternates the holes 15 in which the solid lubricant inserts 17 are provided.

FIGS. 8-13 which are discussed below are directed to a snap-ring bearing assembly that incorporates the bearing designs of the present invention. The bearing assembly is designed to perform well in extreme high/low temperature ranges where exposure to chemicals and/or debris is possible. The bearing assembly is also resistant to high loads and thrust. The design of the bearing assembly effects routing debris away from the wearing surface and embedding the debris into the lubricant, e.g. graphite, inserts, thereby making the bearing assembly resistant to dust and other foreign material.

Figure 8:
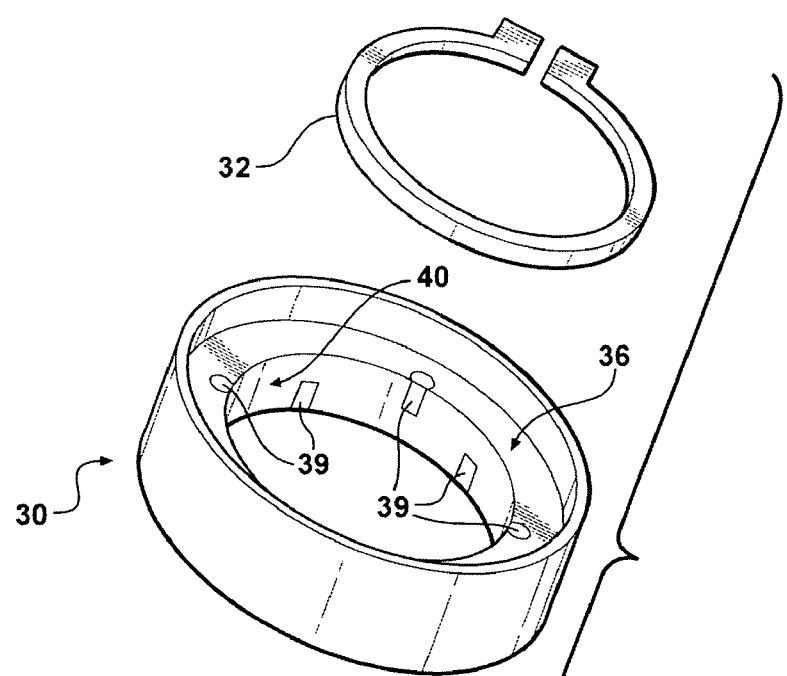
FIG. 8 is an exploded view of a bearing assembly according to one embodiment of the present invention.
Figure 8:
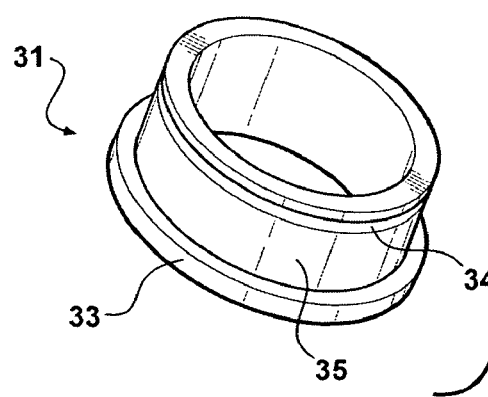

FIG. 8 is an exploded view of a bearing assembly according to one embodiment of the present invention. The bearing assembly includes an outer bushing 30 and an inner bushing 31 configured to be received in the outer bushing 30, and a retainer 32 which secures the inner bushing 31 within the outer bushing 30.

The inner bushing 31 has a generally cylindrical shape with a flange 33 extending radially outward on one end and an annular groove 34 provided in the outer wall 35 near the other end. The annular groove 34 is sized to receive the retainer 32 as discussed below.

The outer bushing 30 has a generally cylindrical shape with a first recess 36 on one end that is configured to receive retainer 32 therein and a second recess 37 (See FIG. 11) on the other end that is configured to receive the flange 33 of the inner bushing 31 as discussed below.

The outer bushing 30 includes a plurality of solid lubricant inserts 39 in the inner wall 40 thereof. In the embodiment shown in FIGS. 8-10 the outer bushing 30 has a plurality of lubricant inserts 39 that are arranged in a manner similar to that shown and discussed in reference to FIGS. 2-5 above. That is, the lubricant inserts 39 are arranged so as to extend alternatively from opposite ends of the outer bushing 30 and be exposed along the inner wall 40 thereof.

The retainer 32 can be a convention al snap-ring as shown, which is sized and configured to be received in annular groove 34 provided in inner bushing 31. Any other suitable mechanical retaining element could also be used.

Figure 9:
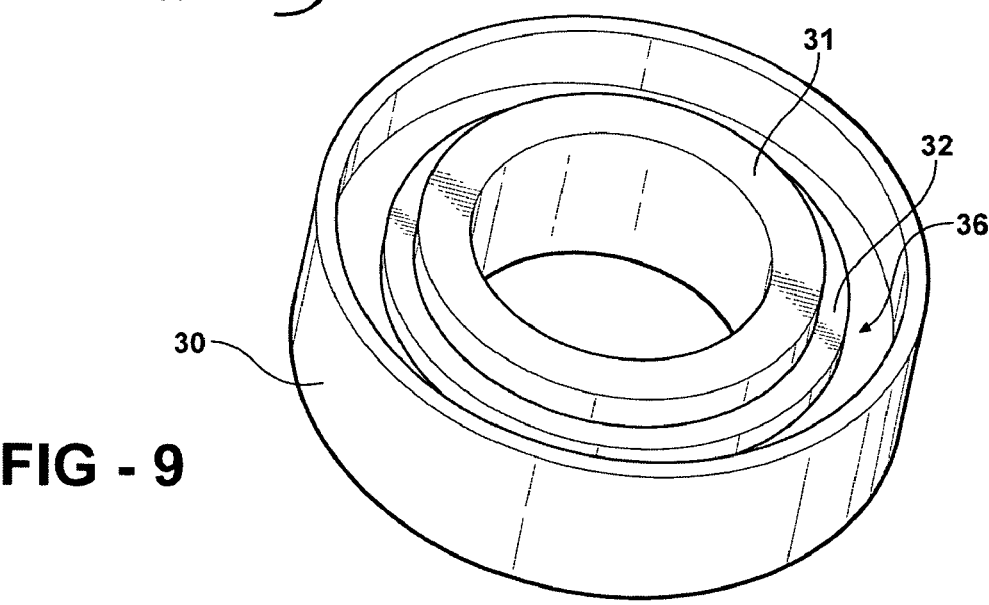
FIG. 9 is a perspective view of the bearing assembly of FIG. 8.
Figure 10:
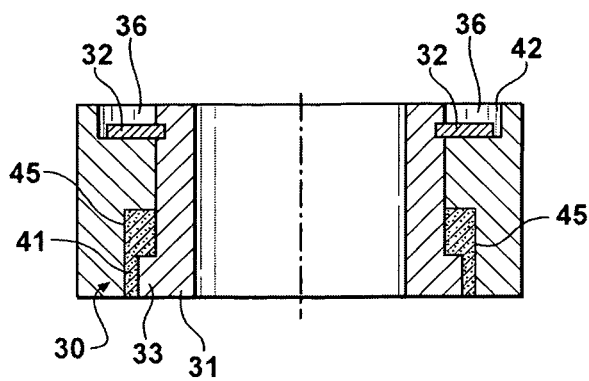
FIG. 10 is a cross-sectional view of the bearing assembly of FIG. 9.

FIG. 9 is a perspective view of the bearing assembly of FIG. 8. FIG. 10 is a cross-sectional view of the bearing assembly of FIG. 9. As best shown in FIG. 10, the assembly is produced by inserting the inner bushing 31 into the outer bushing 30 until the flange 33 on the end of the inner bushing 31 abuts against the stepped portion 41 of the recess 37 provided in the end of the outer bushing 30. When the inner bushing 31 is positioned in this fashion, the annular groove 34 provided in the outer wall 35 of the inner bushing 31 near the opposite end of the flange 33 is substantially level with the bottom surface 42 of the recess 36 provided in the opposite end of the outer bushing 30. The retainer 32 can then be expanded, inserted into recess 36 and released to engage the inner bushing 31 about annular groove 34. In this manner, the inner bushing 31 is held in place by abutment between flange 33 and recess 37 in the end of the outer bushing 30 and abutment between the retainer 32 and the recess 36 in the other end of the outer bushing 30, while being free to rotate within the outer bushing 30.

Figure 11:
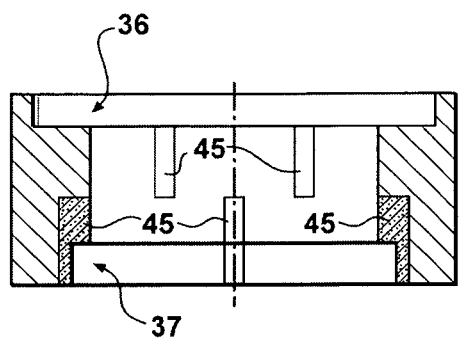
FIG. 11 is a cross-sectional view of the outer bushing of the bearing assembly of FIG. 10.

FIG. 11 is a cross-sectional view of the outer bushing of the bearing assembly of FIG. 10. As depicted, the diameter of the upper recess 36 is larger than the diameter of the lower recess 37. As a practical matter, the diameter of the upper recess 36 has to be large enough to allow for insertion and removal of the retainer 32 from the annular groove 34 provided in the outer wall 35 of the inner bushing 31. The lubricant inserts 45 are shown in FIG. 11 (and FIG. 10), as extending through to the end of the of the outer bushing 30 and intersecting the edges of flange 37 while the opposite lubricant inserts 45 that extend from the other end of the outer bushing 30 terminate at the level of flange 36 due to the relative diameters of the recesses 36 and 37. The effect is that the lubricant inserts 45 extend to both ends of the outer bushing 30 at the inner wall 40.

Figure 12:
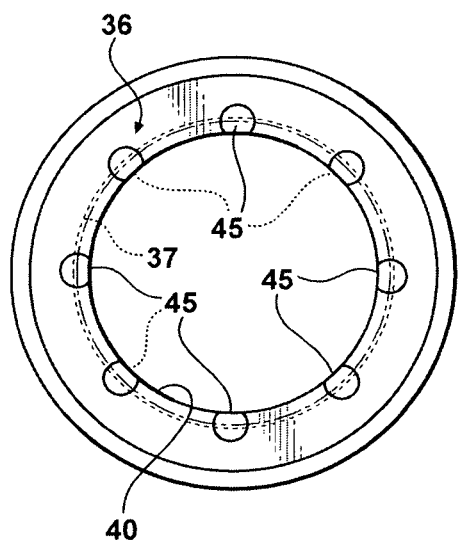
FIG. 12 is a top view of the outer bushing of the bearing assembly of FIG. 10.
Figure 13:
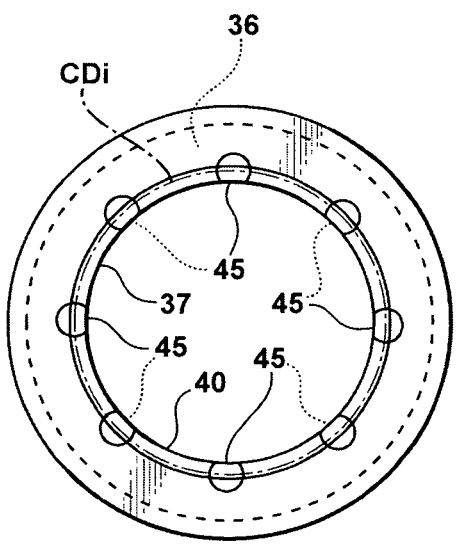
FIG. 13 is a bottom view of the outer bushing of the bearing assembly of FIG. 10.

FIG. 12 is a top view of the outer bushing of the bearing assembly of FIG. 10. FIG. 13 is a bottom view of the outer bushing of the bearing assembly of FIG. 10. FIGS. 12 and 13 depict an exemplary embodiment in which the relative diameters of the recesses 36 and 37 in comparison to the inner wall 40 of the outer bushing 30 and the size and configuration of the lubricant inserts 45. It is to be understood of course that the relative dimensions shown in the figures are provided as non-limiting examples and that the inner and outer bushings 30 and 31 can have different relative dimensions than those shown.

Figure 14:
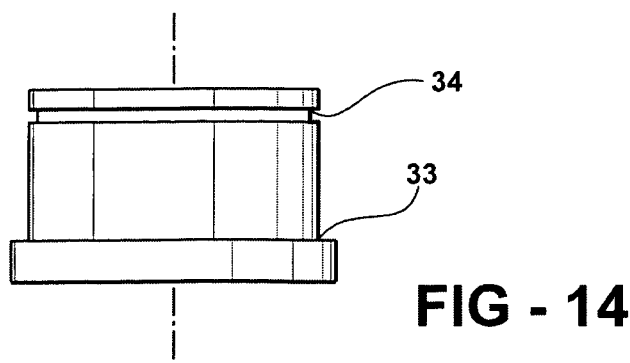
FIG. 14 is a side view of the inner bushing of the bearing assembly of FIG. 10.

FIG. 14 is a side view of the inner bushing of the bearing assembly of FIG. 10. FIG. 14 shows relative dimensions of the annular groove 34 and the flange 33 that are provided on the opposite ends of the inner bushing, it being understood that the relative dimensions and configurations are compatible with the bearing assemble of FIGS. 8-13 and that in other embodiments the dimensions and configurations can be different from that shown.

It is noted that the bearings and bushings of the present invention can be configured so that the exposed side edge portions of the lubricant inserts are either substantially flush with the inner or outer surfaces of the bearings and bushings, or substantially flush with both the inner or outer surfaces of the bearings and bushings.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above.

What is claimed is:

1. A bearing assembly which comprises:
   an outer bushing having a main body portion that has a generally cylindrical shape defined by an annular wall having an inner surface and an outer surface and a central axis;
   an inner bushing having a main body portion that has a generally cylindrical shape defined by an annular wall having an inner surface and an outer surface and a central axis, said inner bushing being configured to be received within the outer bushing so that the outer surface of the inner bushing is opposed to the inner surface of the outer bushing; and
   a plurality of elongated lubricant inserts that have central axes, and are provided in bores formed in the main body of the outer bushing and aligned so that exposed side edge portions of the lubricant inserts are substantially flush with the inner surface of the main body of the outer bushing, said plurality of elongated inserts having a generally circular cross-sectional shape exclusive of the exposed side edge portions, said exposed side edge portions having a width which is less than the cross-sectional diameter of the elongated inserts.

2. A bearing assembly according to claim 1, wherein the inner bushing has a radial projecting flange on one end and an annular groove provided in the outer surface adjacent the other end and the bearing assembly further comprises a retainer that is configured to engage the annular groove.

3. A bearing assembly according to claim 2, wherein the outer bushing includes a recess on one end that is configured to receive the retainer.

4. A bearing assembly according to claim 3, wherein the outer bushing includes a recess on another end which is configured to receive the radial projecting flange of the inner bushing.

5. A bearing assembly according to claim 1, wherein the side edge portions of the lubricant inserts that are substantially flush with the main body of the outer bushing and aligned so that side edge portions of the lubricant inserts are substantially flush with the inner surface of the main body of the outer bushing comprise edge portions that extend along the entire length of the lubricant inserts.

6. A bearing assembly according to claim 1, wherein the main body of the outer bushing and the plurality of lubricant inserts have lengths that are substantially equal.

7. A bearing assembly according to claim 1, wherein the main body of the outer bushing has a length that is greater than a length of the plurality of lubricant inserts.

8. A bearing assembly according to claim 7, wherein the length of the plurality of lubricant inserts is about half of the length of the main body of the outer bushing and the plurality of lubricant inserts alternatively extend inward from opposite ends of the main body of the outer bushing.

9. A bearing assembly according to claim 1, wherein the main body of the outer bushing has an inside diameter, $ID_b$, the central axes of the plurality of lubricant inserts are aligned about common diameter $CD_i$ of the main body of the outer bushing that is greater that the inside diameter and each of the plurality of lubricant inserts has a radius $R_i$, wherein $ID_b < CD_{i<(IDb} + 2R_i)$.

10. A bearing assembly according to claim 1, wherein the said lubricant inserts extend to at least one end of the main body of the outer bushing.

11. A bearing assembly which comprises:
    an outer bushing having a main body portion that has a generally cylindrical shape defined by an annular wall having an inner surface and an outer surface and a central axis;
    an inner bushing having a main body portion that has a generally cylindrical shape defined by an annular wall having an inner surface and an outer surface and a central axis, said inner bushing being configured to be received within the outer bushing so that the outer surface of the inner bushing is opposed to the inner surface of the outer bushing; and
    a plurality of elongated lubricant inserts that have central axes, and are provided in bores formed in the main body of the inner bushing and aligned so that exposed side edge portions of the lubricant inserts are substantially flush with the outer surface of the main body of the inner bushing, said plurality of elongated inserts having a generally circular cross-sectional shape exclusive of the exposed side edge portions, said exposed side edge portions having a width which is less than the cross-sectional diameter of the elongated inserts.

12. A bearing assembly according to claim 11, wherein the inner bushing has a radial projecting flange on one end and an annular groove provided in the outer surface adjacent the other end and the bearing assembly further comprises a retainer that is configured to engage the annular groove.

13. A bearing assembly according to claim 12, wherein the outer bushing includes a recess on one end that is configured to receive the retainer.

14. A bearing assembly according to claim 13, wherein the outer bushing includes a recess on another end which is configured to receive the radial projecting flange of the inner bushing.

15. A bearing assembly according to claim 11, wherein the side edge portions of the lubricant inserts that are substantially flush with the main body of the inner bushing and aligned so that side edge portions of the lubricant inserts are substantially flush with the outer surface of the main body of the inner bushing comprise edge portions that extend along the entire length of the lubricant inserts.

* * * * *

UNITED STATES PATENT AND TRADEMARK OFFICE
CERTIFICATE OF CORRECTION

PATENT NO.         : 7,320,549 B2                                         Page 1 of 1
APPLICATION NO.    : 11/129888
DATED              : January 22, 2008
INVENTOR(S)        : Masaaki Kubota, Jun Osawa and Larry Mitchum It is certified that error appears in the above-identified patent and that said Letters Patent is hereby corrected as shown below:

On the title page, Item 73, the Assignee name should read -- Sankyo Oilless Industry, (USA) Corp. --

Signed and Sealed this

Twenty-second Day of July, 2008

JON W. DUDAS
*Director of the United States Patent and Trademark Office*